United States Patent Office 3,369,912
Patented Feb. 20, 1968

3,369,912
SELF-PROPELLING FOOD MIXTURE
Samuel M. Livengood, Ossining, and Robert G. Werner, Syosset, N.Y., assignors to Union Carbide Corporation, a corporation of New York
No Drawing. Filed Mar. 20, 1967, Ser. No. 624,149
2 Claims. (Cl. 99—189)

ABSTRACT OF THE DISCLOSURE 1-chloroheptafluoropropane is employed as a propellant for a self-propelling food mixture confined under pressure in an aerosol-dispensing container. The mixture consists of an aerosol-dispensable, foamable, edible food formulation and the propellant.

This invention relates to self-propelling foamable food mixtures and is particularly related to the use of 1-chloroheptafluoropropane as an aerosol food propellant in such mixtures.

Nitrous oxide, carbon dioxide and mixtures thereof are well known propellants for aerosol-dispensable food formulations. A mixture of 85% by weight nitrous oxide and 15% by weight carbon dioxide has been most widely used, primarily for whipped cream. The foamed food products dispensed from aerosol containers with the aid of these conventional propellants have limited durability since the foam coarsens and collapses within a relatively short time. This lack of durability is a serious disadvantage in cases of those products which are not intended for immediate consumption and are often prepared hours before being served or consumed, such as, for example, cake frostings.

U.S. 2,849,323 has disclosed the use of perfluorocyclobutane as a suitable propellant for food formulations since it is non-toxic, non-flammable in air, inert to water and non-corrosive to the metals of the aerosol-dispensing container. Although the use of perfluorocyclobutane and polyfluorocyclobutane is considerably more advantageous than the use of conventional aerosol propellants ($N_2O$, $CO_2$ and mixtures thereof), they are considerably more expensive and it is frequently desirable to employ a less expensive propellant or mixture of propellants.

U.S. 2,952,547 discloses a self-propelling food mixture in which the main propellant is a cheap gas such as nitrous oxide, carbon dioxide and mixtures thereof and which produces products having better and more durable foamed structure. The propellant disclosed in this patent consists of a mixture of from about 47 to about 15 mole percent of perfluorocyclobutane and from about 53 to about 85 mole percent of a member of the group consisting of nitrous oxide, carbon dioxide and mixtures of nitrous oxide and carbon dioxide. The disadvantage of such propellant system is that a two-step filling process is necessary, one for the injection of perfluorocyclobutane (a liquefied gas) and the other for the injection of the compressed gases, i.e., carbon monoxide and/or nitrogen.

It is thus an object of this invention to provide a self-propelling food mixture which contains a novel propellant or combination of propellants. It is also an object of this invention to provide a self-propelling food mixture which contains a novel propellant or combination of propellants and which produces products having better and more durable foamed structure. It is a further object of this invention to provide a novel composition of matter.

The objects of this invention are accomplished by providing a self-propelling food mixture confined under pressure in an aerosol-dispensing container, said mixture consisting essentially of an aerosol-dispensable, foamable, edible food formulation and a propellant for said food formulation. The propellant employed in this invention is 1-chloroheptafluoropropane alone or, in some cases, in admixture with conventional propellants, i.e., nitrous oxide, carbon dioxide or mixtures thereof.

The self-propelling food mixtures of this invention may be prepared in the conventional manner by charging an aerosol-dispensable container with an aerosol-dispensable and foamable, edible food formulation, then charging said container under a pressure corresponding to about 40 p.s.i.g. at 70° F. with the propellant. To dispense the food formulation, the valve of the container is opened to release the pressure whereby the contents of the container are expelled under the pressure of the propellant. It is preferable to shake the container to mix its content prior to releasing the pressure.

The aerosol containers which can be employed are conventional in form and construction and are well known in the art.

1-chloroheptafluoropropane has a vapor pressure of approximately 47 p.s.i.g. at 70° F. It is non-flammable in air, non-toxic, inert to water and non-corrosive to the metals of the aerosol-dispensing containers. These properties are important for successful application of a compound as an aerosol propellant.

The aerosol-dispensable food formulations of this invention include such materials as dessert toppings, cake frostings and whipped creams. In general, the aerosol-dispensable food formulations with which the present invention is concerned are those designed to have a foamed structure, that is, those self-propelling food formulations which on discharge contain the propellant dispersed therein.

The propellant of this invention is ordinarily used in quantities providing about 40 p.s.i.g. at about 70–72° F. in the conventional aerosol container. The quantity of 1-chloroheptafluoropropane in the food formulation will usually range from about 5% to about 10% by weight of the food formulation and will depend, in part, on the size of the container, the ratio of the volume of the food formulation to the volume of the container and on the particular food formulation, its viscosity and its foaming characteristics.

A mixture of heavy cream and 1-chloroheptafluoropropane was tested as an aerosol-food formulation. The heavy cream was first charged to a container equipped with a standard flow valve similar to those now used with commercial aerosol whipped toppings. The container was then pressurized with the propellant, i.e., 1-chloroheptafluoropropane so that the relative concentrations of the propellant and heavy cream in the mixture were 10% and 90% by weight, respectively. The heavy cream which was ejected from the container showed satisfactory foam characteristics similar to aerosol whipped creams now on the market.

What is claimed is:
1. A self-propelling food mixture confined under pressure in an aerosol-dispensing container, said mixture consisting essentially of an aerosol-dispensable food and 1-chloroheptafluoropropane.
2. A self-propelling food mixture as in claim 1 wherein said 1-chloroheptafluoropropane constitutes from about 5 weight percent to about 10 weight percent of said mixture.

References Cited
UNITED STATES PATENTS 2,719,129   9/1955   Richardson _____ 252—305
3,131,154   4/1964   Klavsner _____ 252—305

A. LOUIS MONACELL, Primary Examiner.
S. DAVIS, Assistant Examiner.